United States Patent [19]

Pichon et al.

[11] 4,167,227

[45] Sep. 11, 1979

[54] METHOD AND INSTALLATION FOR ORDERING GROUPS OF ARTICLES IN STACKS OR ROWS

[75] Inventors: Jean-Louis Pichon; Désiré Lousteau; Jean-Pierre Volat, all of Paris, France

[73] Assignee: "Hotchkiss Brandt Sogeme" H.B.S., Paris, France

[21] Appl. No.: 882,171

[22] Filed: Feb. 28, 1978

[30] Foreign Application Priority Data

Mar. 1, 1977 [FR] France .................................. 77 05935

[51] Int. Cl.² .................................................. B65G 47/28
[52] U.S. Cl. .................................. 198/456; 271/30 A; 271/149
[58] Field of Search ........................... 198/456; 214/9; 271/30 A, 129, 149, 150, 221, 250

[56] References Cited

U.S. PATENT DOCUMENTS

| | | | |
|---|---|---|---|
| 2,739,809 | 3/1956 | Pearce | 271/150 |
| 3,647,203 | 3/1972 | DeHart | 271/149 |
| 3,931,880 | 1/1976 | Ayer | 271/150 |

*Primary Examiner*—Jeffrey V. Nase
*Attorney, Agent, or Firm*—Cushman, Darby & Cushman

[57] ABSTRACT

Method and installation for ordering groups of articles in stacks or rows, in which groups of articles are inserted between pressure members which are driven in displacement by means of an endless chain, the members being caused to move apart from one another while maintained the same overall speed in a so called "jogging zone" where the articles are made up into a group propelled toward a vertical abutment, the pressure members being closed up again in a dealing out zone, before reaching a dispensing device.

15 Claims, 11 Drawing Figures

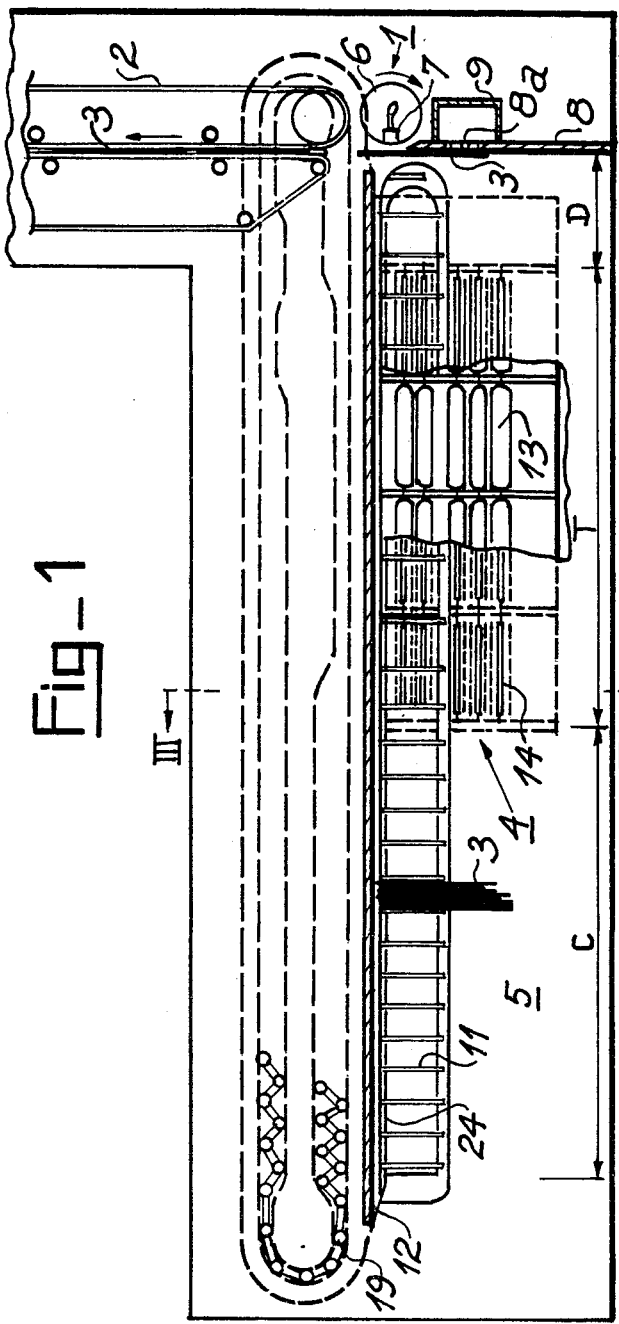
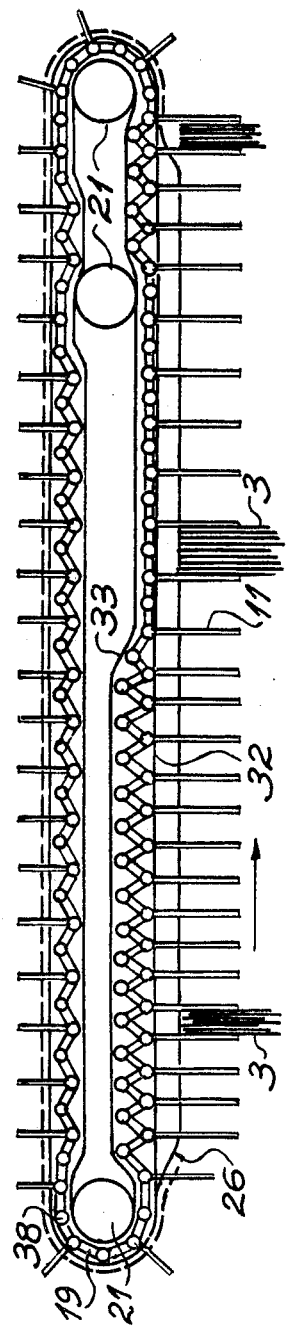

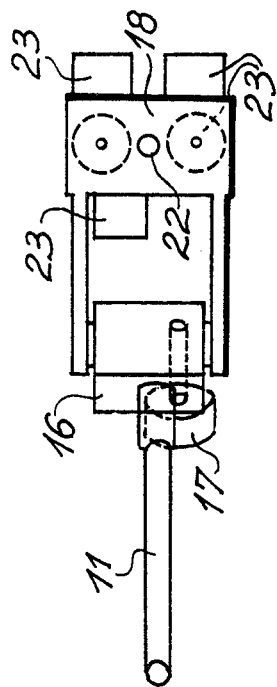
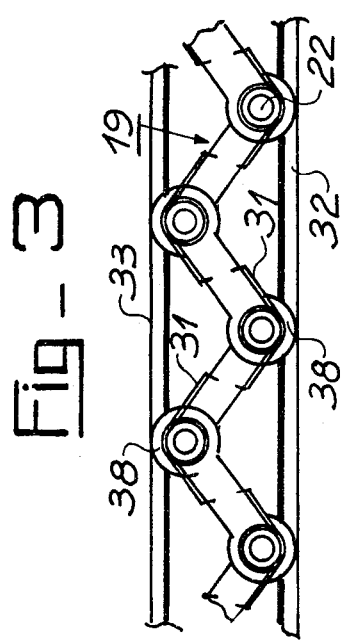
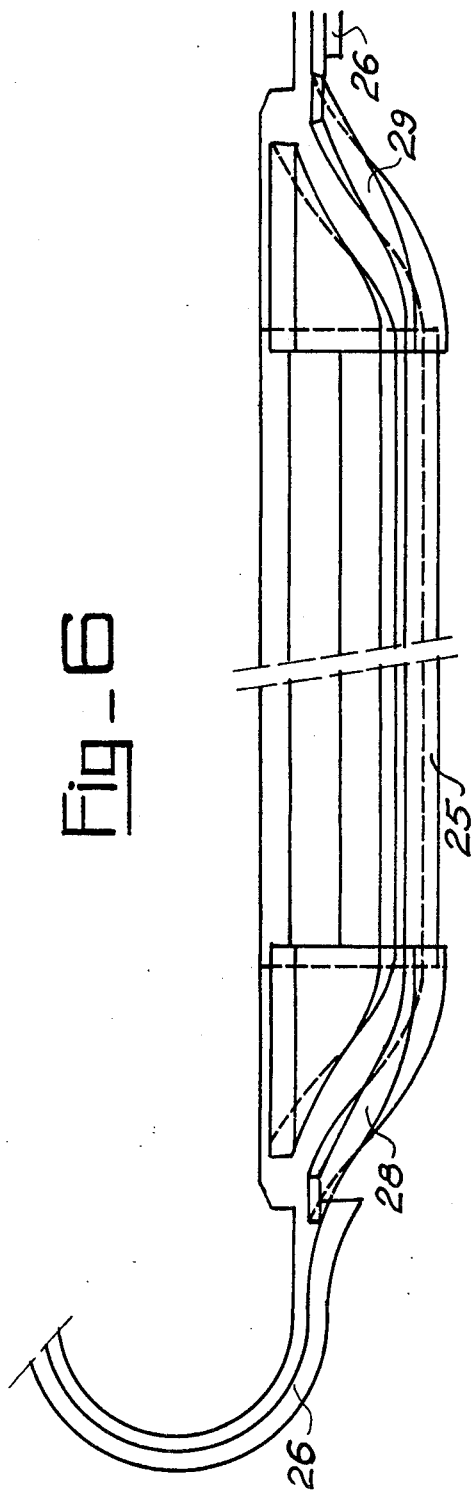

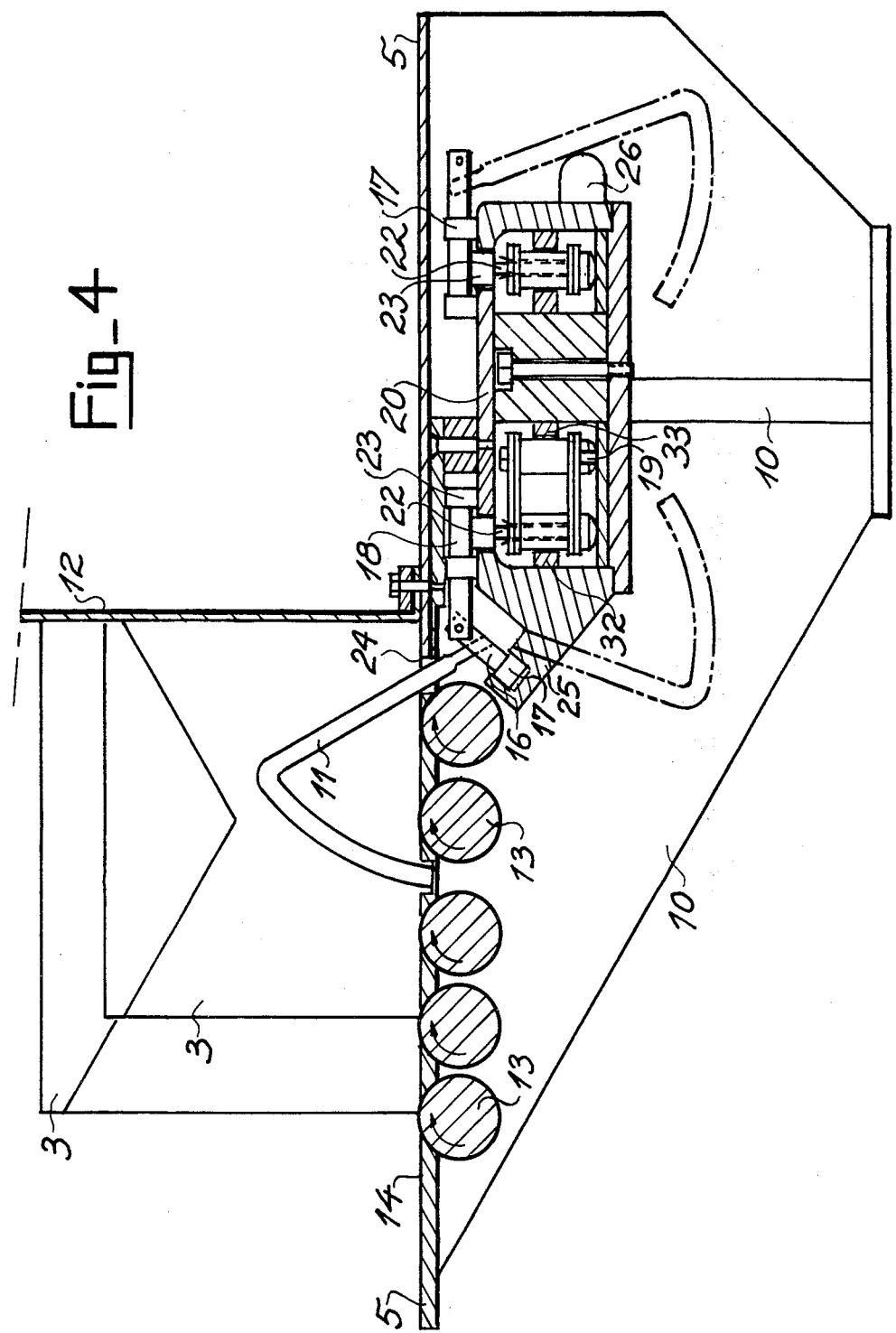

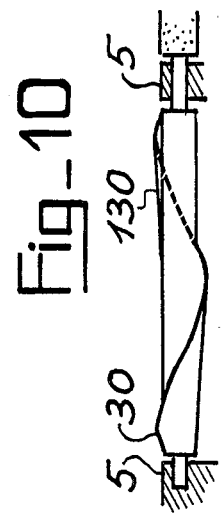
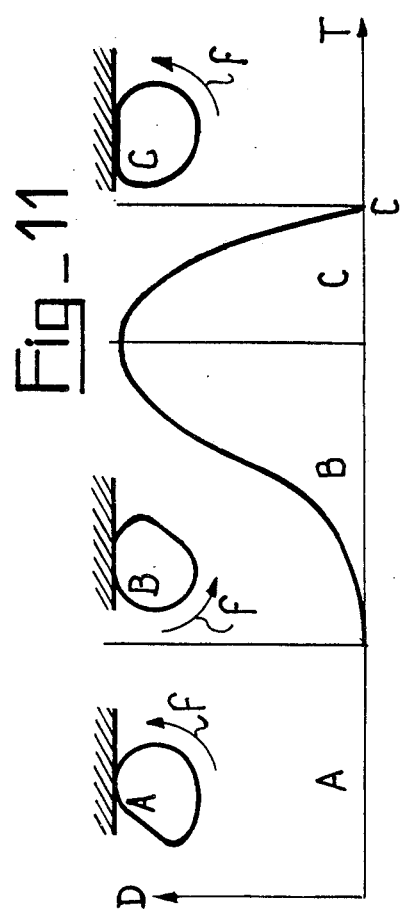
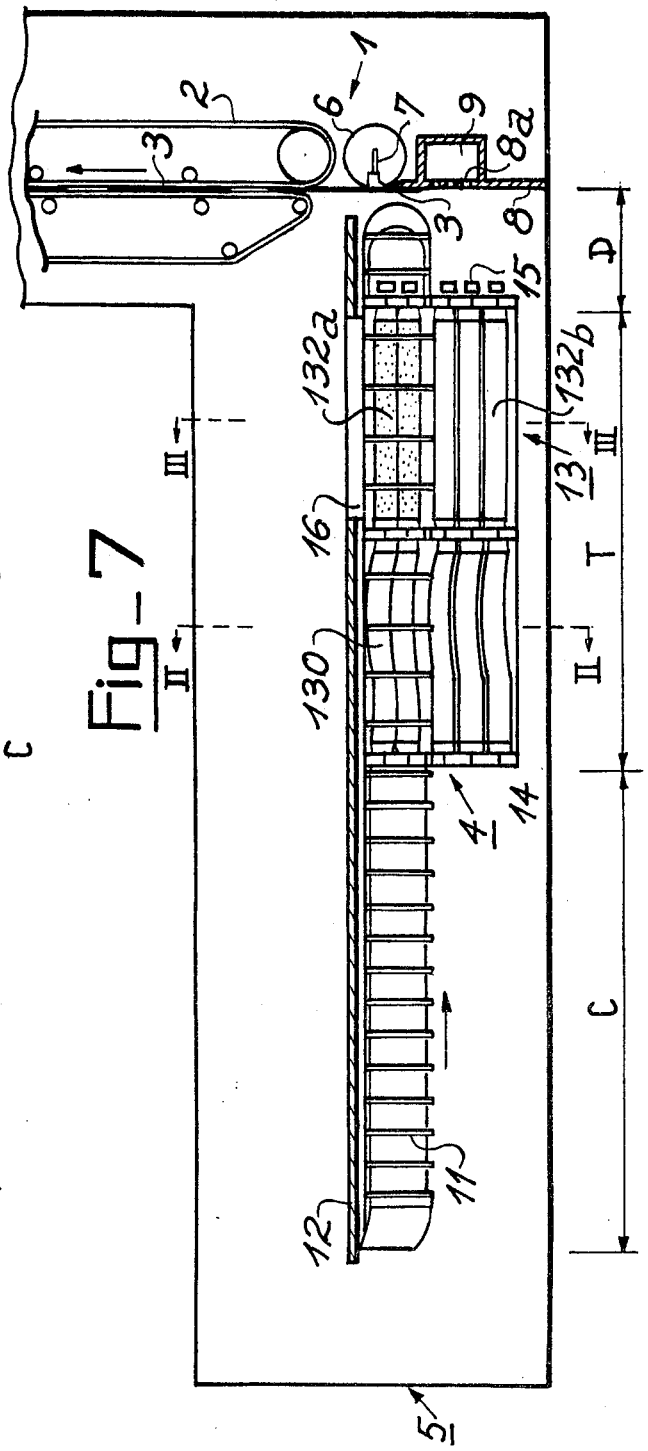

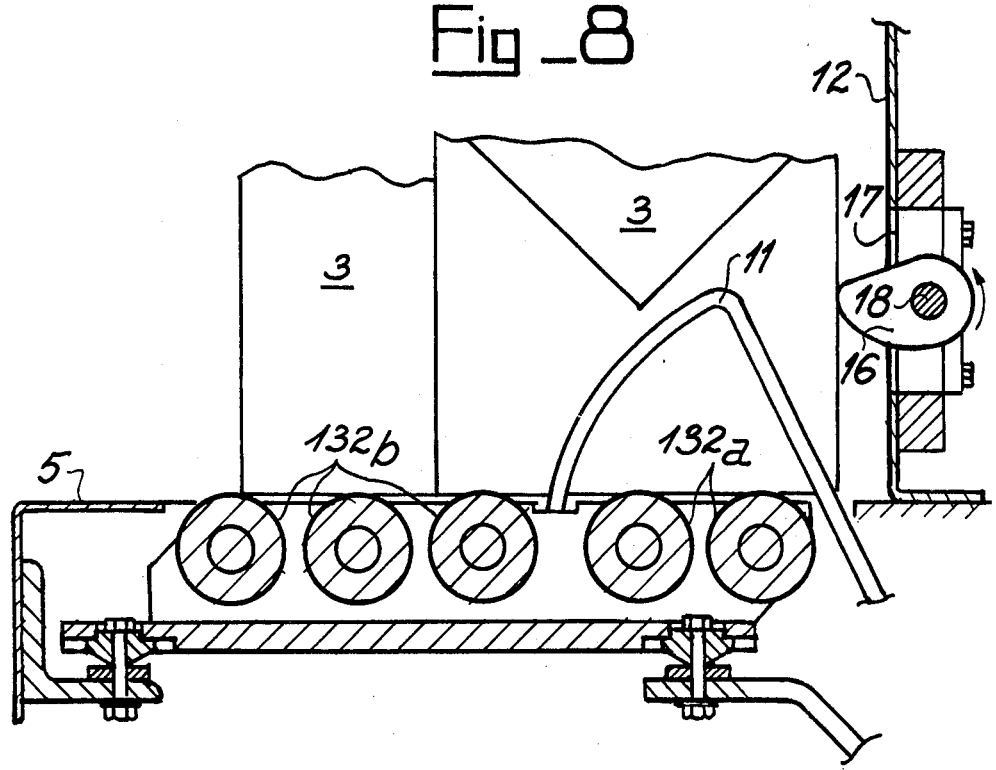
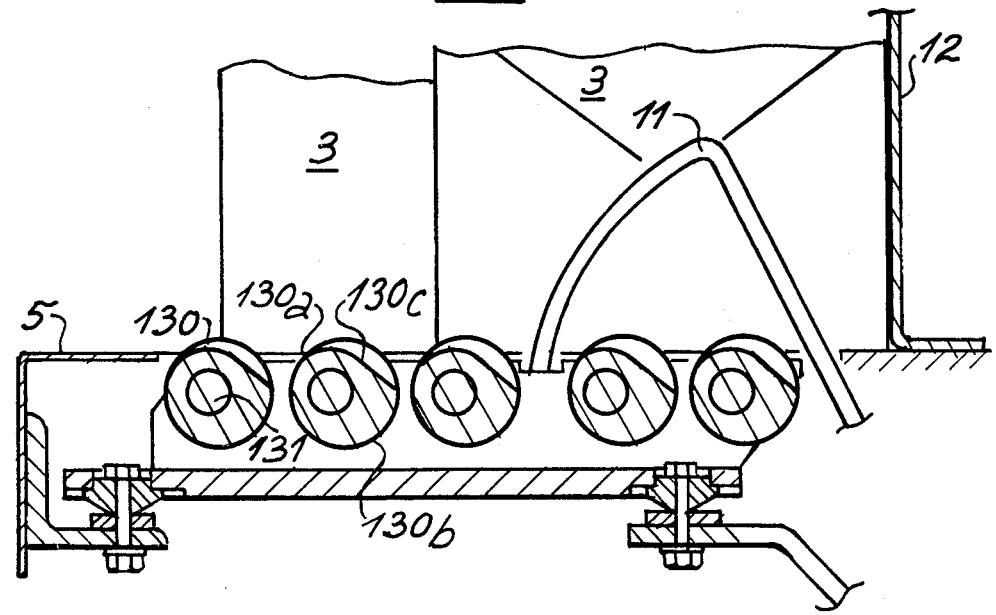

METHOD AND INSTALLATION FOR ORDERING GROUPS OF ARTICLES IN STACKS OR ROWS

The present invention, relates to a method and an installaion for ordering groups of articles in stacks or rows, and in particular thin articles which can then be fed to a device for dispensing them individually. The articles are for example letters (postal or other envelopes), cheques, invoices and similar documents, etc.

The dispensing devices which are used to take the articles one by one from a stack or row in the order in which they present themselves so that they can be fed to a processing installation for example, generally operate satisfactorily provided that the position of the articles at the time when they are removed from the stack or row is very accurately defined. In particular it is essential that the leading edges of the articles should all be exactly in line. It is therefore necessary to tamp or "jog" the articles at least against a vertical plane or even, preferably, simultaneously against a vertical plane on the one hand and a horizontal plane on the other.

An object of the present invention is to enable these results to the achieved automatically with stacks or rows of articles arranged with no special care. A method of ordering groups of articles in stacks or rows which may them be dispensed one by one by a dispensing device according to the present invention comprises the following steps of: inserting the groups of articles between pressure members which are driven in displacement; causing the pressure members to move apart from one another along a path corresponding to a jogging zone whilst their overall speed of advance remains the same, and at the same time the articles making up a group propelled towards a wall forming a vertical abutment so as to cause said articles to align themselves by one of their edges; closing up said pressure members again, along a path corresponding to a dealing out zone, before the articles arrive at the dispensing device.

Another object of the present invention is an installation for ordering groups of articles in stakes or rows which are to be dispensed one by one by a dispensing device and thus according to the method recited above. Such an installation comprises:

a plurality of pressure members for applying pressure to the articles, said members being secured to an endless chain along that they are distributed and which is responsible for moving them along a cyclic path divided at least in three successive zones termed "loading", "jogging" and "extracting" zones, means for acting on the articles to thrust them towards a vertical abutment, said means being arranged in said jogging zone, means for causing the pressure members to close up outside said jogging zone and means for causing said members to spead apart in said jogging zone.

The invention may be used in particular in automatic postal sorting apparatus.

The invention will be better understood from the following explanation and from the accompanying FIGS., in which:

FIG. 1 is a schematic general view of an installation according to the invention, FIG. 2 is a schematic view showing an endless chain associated with pressure fingers, FIG. 3 is a detail view of the links of the chain, FIG. 4 is an enlarged-scale view in cross-sectional elevation on line III—III of FIG. 1, FIG. 5 is a detail view of a pressure member, FIG. 6 is a schematic view of the system for guiding the pressure members, FIG. 7 is a schematic view of a modified embodiment of certain component parts of the installation of FIG. 1, FIG. 8 is a cross-sectional view in elevation on line III—III of FIG. 7, FIG. 9 is a cross-sectional view in elevation on line II—II of FIG. 7, FIG. 10 is a view of the exterior of a helical roller, FIG. 11 is a diagram showing the change, as a function of time, in the distance between the lower edge of an article and the horizontal surface on which it rests.

With a view to simplicity, the same items bear the same reference numerals in all the FIGS.

In FIG. 1 can be seen a device 1 for dispensing articles 3 (for example: letters) individually, which takes hold of the letters one by one and feeds them to a belt conveyor 2. The dispensing device 1 co-operates with a letter supply installation 4 according to the invention. All the operations take place on a horizontal surface 5 which is supported by a fixed structure which can be seen in one of the figures which will be described subsequently.

The letter dispensing device 1 may, for example, be of the pneumatic type and comprises a rotary extractor drum 6 whose axis is perpendicular to the surface 5 and through whose perforated wall suction is applied from a fixed chamber 7 connected to a source of fluid at reduced pressure (not shown). Upstream of the drum 6 is arranged a wall 8 which forms an abutment for the letters and which has a perforated zone to which suction is applied from an enclosure 9 to ensure that the letter following that currently being extracted is held back.

Associated with this dispensing device 1 is a letter supply installation 4 according to the invention. The latter includes a plurality of pressure members or fingers 11 which advance in the direction of the drum 6 and the wall 8. Bundles of letters may be put down between each pair of fingers in what is termed a loading zone C by a human (or automatic) handler without any special precautions, the letters resting on edge against surface 5. Facing the leading edge of the letters is arranged a wall 12 which is substantially perpendicular to the surface 5 and parallel to the direction of movement of the fingers 11 and which forms a vertical abutment for lining up the leading edges. This wall 12 preferably has a substantially smooth surface.

In addition, underneath the surface 5, in what is termed a jogging zone T which is situated downstream of the loading zone C and upstream of the extracting zone D, are arranged a set of first rotary rollers 13 whose axes are substantially parallel to the direction of movement of the fingers 11. These rollers, which come substantially flush with the surface 5 through openings 14 formed in said surface, are driven in rotation (by means which are not shown) in such a way as to thrust the letters towards the wall 12. In this way, no matter what the initial position of the letters, their leading edges are caused to butt against the vertical abutment 12 also termed a "jogging barrier" and are thus lined up correctly.

The position of the wall 12 relative to the extractor drum 6 is of course chosen in such a way as to enable the said drum to extract the letters properly. So that the "jogging" operation shall take place as satisfactorily as possible, and in accordance with the method of the invention, it is advisable for the letters to be relatively loosely spaced in the jogging zone T, whereas at the time of the loading (zone C) and extraction (zone D) operations, it is preferable for them to be relatively tightly packed. As will now be described, and in accordance with the invention, the letters are moved along in such a way as to become less tightly paced at the time of the jogging operation (lining up) and then to become more tightly packed again just before extraction. The fingers 11 are driven along a cyclic path by a traction member which is for example an endless chain 19 travelling round within a casing.

FIG. 2 is a schematic view which shows more clearly the endless chain 19. The chain is driven by sprockets 21 whose axes are substantially vertical. On the outward path, it moves between two guides 32 and 33 which co-operate with the rollers 38 of the chain.

FIG. 3 is an enlarged-scale view of a detail of such a chain 19. The chain is formed from links comprising rollers 38 and springs 31 which tend to fold the links towards one another. In the loading zone (C), the guides 32 and 33 are far enough apart to allow the chain to be substantially collapsed concertina fashion. The fingers 11 are thus relatively close together and the letters are therefore packed tight. In the jogging zone (T), where the lining-up operation is to take place, the guides 32 and 33 are close together, which causes the chain to be displaced, the finges to move apart and thus the letters to become less tightly packed. In the dealing out or extracting zone (D), the guides 32, 33 return to substantially their original spacing, which causes the fingers to close up again.

As FIGS. 4 and 5 show, each finger 11, which is bent into the shape of an inverted V, is secured to an arm 16 provided with a roller 17. This arm 16 is pivoted in a clevis 18 which is able to move between the surface 5 and a casing 20 under the guidance of rollers 23. The clevis is fitted with a pivot pin 22 which fits through the casing 20 into one of the rivets around which the chain 19 hinges between two links. The fingers 11, which are regularly spaced along the chain 19 and which are separated by even numbers of links (two in the embodiment shown), are thus secured in displacement to the chain. On the outward path, that is to say the path towards the dealing out device 1, the fingers are in a raised, vertical position, passing through surface 5 via a slot 24. They are held in position at this time by a through-shaped guide 25 secured to the casing 20 which co-operates with the rollers 17 on the arms 16. On the return path, they are in a withdrawn position underneath the surface 5 and are guided by the edge 26 of the casing 20.

As is shown in FIG. 6, guide systems 28 and 29 which co-operate with the rollers 17 respectively enable the fingers to be raised at the beginning of the loading zone and to be retracted near the dealing out device (extracting zone). An installation as described above causes the articles to be jogged against a vertical plane, namely the vertical abutment-forming wall 12. A modified embodiment of an installation according to the invention will now be described. This enables the articles to be jogged against both the horizontal surface 5 and the vertical wall 12.

FIG. 7 shows the parts of an installation such as that which is shown in FIG. 1, but which are modified. This modification is confined substantially to the jogging zone T.

Underneath the surface 5, opposite openings 14 formed in this surface, are arranged two sets of rotary rollers whose axes are substantially parallel to the direction of movement of the fingers 11. These rollers, which lie substantially flush with the surface 5, are all driven in rotation together from pulleys 15, so that they thrust the letters towards the jogging wall 12. The principal function of a first set of first rotary rollers 13 of circular cross-section is to tamp the letters by lining them up against the wall 12 which forms a lining-up abutment (or jogging barrier).

The principal functionof a second set of second rotary rollers 130 is to tamp the letters by lining them up against the horizontal surface 5.

The first rotary rollers 13 are preferably divided into two groups. First group 132(a) situated close to the wall 12 have surfaces exhibiting a high coefficient of friction, whereas second group 132(b) remote from the said wall 12 have a low coefficient of friction, their principal function being to support the letters while having only a small propulsive effect on them. It is in fact preferable to drive the letters from the front (rollers 132(a) in order to reduce the danger of crumpling them during this operation. In the embodiment described, the first group of rollers 132(a) are made of rough-surfaced rubber whilst the second group of rollers 132(b) are made of smooth metal.

As is shown in FIG. 8, co-operating with the series of first rollers 13 is at least one auxiliary roller 160 whose axis lies substantially parallel to the direction of movement of the letters and which is arranged in an opening 170 formed in the wall 12.

This roller 160 has an eccentric shaft 180 and its cross-sectional outline is similar to that of the rollers 130 which will be described below. As it rotates, this roller 160 gradually thrusts the letters back from the wall 12 to a position where they are a maximum distance away and then releases them suddenly to allow them to return under the prompting of the rollers 132(a) and strike against the vertical abutment 12.

Such a combination of rollers 132(a) and 132(b), possibly co-operating with a roller 160, may be provided in the jogging zone T of an installation as shown in FIG. 1. When this is the case th rollers 13, instead of being identical, have the characteristics which have just been described, i.e. a difference in coefficient of friction between them depending on whether they are close to or distant from the vertical wall 12.

In the embodiment shown, the configuration of roller 16 is the same from one end to the other. In certain cases however it may possibly be given a helical configuration similar to that of the rollers 130 described below.

As is shown in FIGS. 9 and 10, the rollers 130 have eccentric shafts 131, which enables them to push up the letters periodically and then to let them drop back against the horizontal surface 5.

As an example, their outline shape may have a straight section 130(c) associated with a spiral section consisting of an arc 130(a) of a circle whose centre is the axis of the roller and of an arc 130(b) of an eccentric circle.

It is preferable for all the letters carried by a roller not to rise or drop back at the same time, in order to reduce the noise made by the installation. To this end, the rollers 130 are of helical configuration. In cross-section, a roller 130 has an outline shape which moves round progressively from one end of the roller to the other. On the other hand it is preferable for the rollers 130 themselves to be in phase (FIG. 9), that is to say for their outlines at a given distance from one of their ends to be in identical angular positions.

It may be noted from FIG. 10 that each roller has at its upstream end an oblique portion which leads exactly into the surface 5 whatever the angular position of the roller.

FIG. 11 shows the cycle followed by the articles at the point where the rollers 130 are situated. It is a diagrammatic representation of the change in the distance between the lower edge of a letter and the surface 5 as a function of time, during phases A, B and C of the rotation of a roller 130. When the roller 130 which is taken as an example is in position A (phase A) only gravity is acting on the article. Then, when the roller turns in the direction indicated by the arrow (f), it raises the article (phase B) to a maximum height and then suddenly lets it drop back (zone C), thus giving rise to an impact when the article reaches the horizontal surface 5 at point C.

Thus, as they rotate, the rollers cause the letters to rise and fall successively from one end of the rollers to the other, thus causing a sort of undulation in the letters. Such a provision gives rise to shear forces between the letters which are able to assist in the sliding between them and thus to assist in the jogging of all the letters against the surface 5 at the time of impact following their dropping back.

Article supply installations according to the invention as described enable the method according to the invention to be put into practice. On the one hand they move together and apart the fingers between which the articles are held by using means which are responsible for folding and straightening the links of the transfer chain. This automatically gives the desired change in the spacing of the fingers 11 which assists in the jogging operation, without causing any change in the overall speed at which the fingers advance, which is essential. It may also be mentioned that this result is achieved with only one drive member, namely the chain 19, which is very simple and highly reliable.

On the one hand the rollers 13, which may possibly co-operate with auxiliary rollers 16, provide for jogging against the vertical wall 12, and on the other hand the combination of rollers 13 and 130, and possibly 16, enable jogging to take place both in a horizontal plane and in a vertical plane.

Applications involving a method and an installation according to the invention for feeding thin articles are numerous. Particular mention may be made of arrangements for handling thin articles and in particular those having to do with postal sorting.

What is claimed:

1. Method of ordering groups of articles in stacks or rows which may then be dispensed one by one by a dispensing device, comprising the steps of:
   inserting the groups of articles between pressure members which are driven in displacement,
   causing the pressure members to move apart from one another along a path corresponding to a jogging zone whilst their overall speed of advance remains the same, and at the same time the articles making up a group propelled towards a wall forming a vertical abutment so as to cause said articles to align themselves by one of their edges,
   closing up said pressure members again along a path corresponding to an extracting zone before the articles arrive at the dispensing device.

2. Method according to claim 1, wherein during the step of causing said movement apart, the articles are tamped against said vertical abutment.

3. Method according to claim 1, wherein during the step of causing said pressure members to move apart, the articles are lined up and tamped against said vertical abutment and against an horizontal surface which supports them.

4. Installation for ordering groups of articles in stacks or rows comprising:
   a plurality of pressure members for applying pressure to the articles, said members being secured to an endless chain along which they are distributed and which is responsible for moving them along a cyclic path divided into at least three successive zones termed "loading", "jogging" and "extracting" zones,
   means for acting on the articles to thrust them towards a vertical abutment, said means being arranged in said jogging zone,
   means for causing the pressure members to close up outside said jogging zone and means for causing said members to spread apart in said jogging zone.

5. Installation according to claim 4, wherein said endless chain is made up of links comprising rollers and springs which tend to fold the links toward one another, co-operating with a set of guides which force the links to straighten out in said jogging zone and to fold up outside it, thus bringing about said spreading apart and closing up.

6. Installation according to claim 5, wherein each of said pressue member is formed by a finger pivoted in a clevis secured to the chain, said finger being provided with a roller which is able to co-operate with guides capable of raising the fingers at the beginning of said loading zone and retracting them near said extracting zone.

7. Installation according to claim 4, wherein said means for thrusting the articles towards the vertical abutment are formed by a first set of rotary rollers which are driven in rotation and onto which the articles pass.

8. Installation according to claim 7, wherein said first set of rotary rollers have their axes substantially parallel to the direction of movement of the said pressure members and are of circular cross-section.

9. Installation according to claim 7, wherein said first set of rotary rollers are divided into first and second group, said first group being closer to said vertical abutment and containing rollers having a surface exhibiting a high coefficient of frictin, said second group being more distant from said vertical abutment and containing rollers having a surface which exhibits a low coefficient of friction.

10. Installation according to claim 9, wherein said rollers of said first and second groups have their axes substantially parallel to the direction of movement of said pressure members and are of circular cross-section.

11. Installation according to claim 7 further comprising an auxiliary rotary roller having an axis substantially parallel to the direction of movement of the articles, which is arranged in an opening formed in said vertical abutment and has an eccentric shaft, and which thrusts the articles gradually back from said vertical abutment to a farthest distant position and then releases them suddenly.

12. Installation according to claim 7, wherein said means for thrusting the articles towards said vertical abutment are formed by said first set of first rotary rollers and by a second set of second rotary rollers.

13. Installation according to claim 12, wherein said first set of first rotary rollers co-operates with said second set of second rotary rollers, having eccentric shafts and being capable of pushing the articles up periodically and then letting them drop back against an horizontal surface which supports them, for jogging said articles against said vertical abutment and said horizontal surface.

14. Installation according to claim 13, wherein said second set of second rotary rollers are of helical configuration.

15. Installation according to claim 12, further comprising an auxiliary rotary roller having an axis substantially parallel to the direction of movement of the articles, said auxiliary roller being arranged in an opening formed in said vertical abutment and having an eccentric shaft, thrusting said articles gradually back from said vertical abutment to a furthest distant position and then releases them suddenly.

* * * * *